T. E. MURRAY.
METER TESTING CUT-OUT.
APPLICATION FILED FEB. 7, 1912.

1,090,489.

Patented Mar. 17, 1914.
2 SHEETS—SHEET 1.

Witnesses:
May T. McGarry
Allen W. Goose

Inventor
Thomas E. Murray
By his Attorney

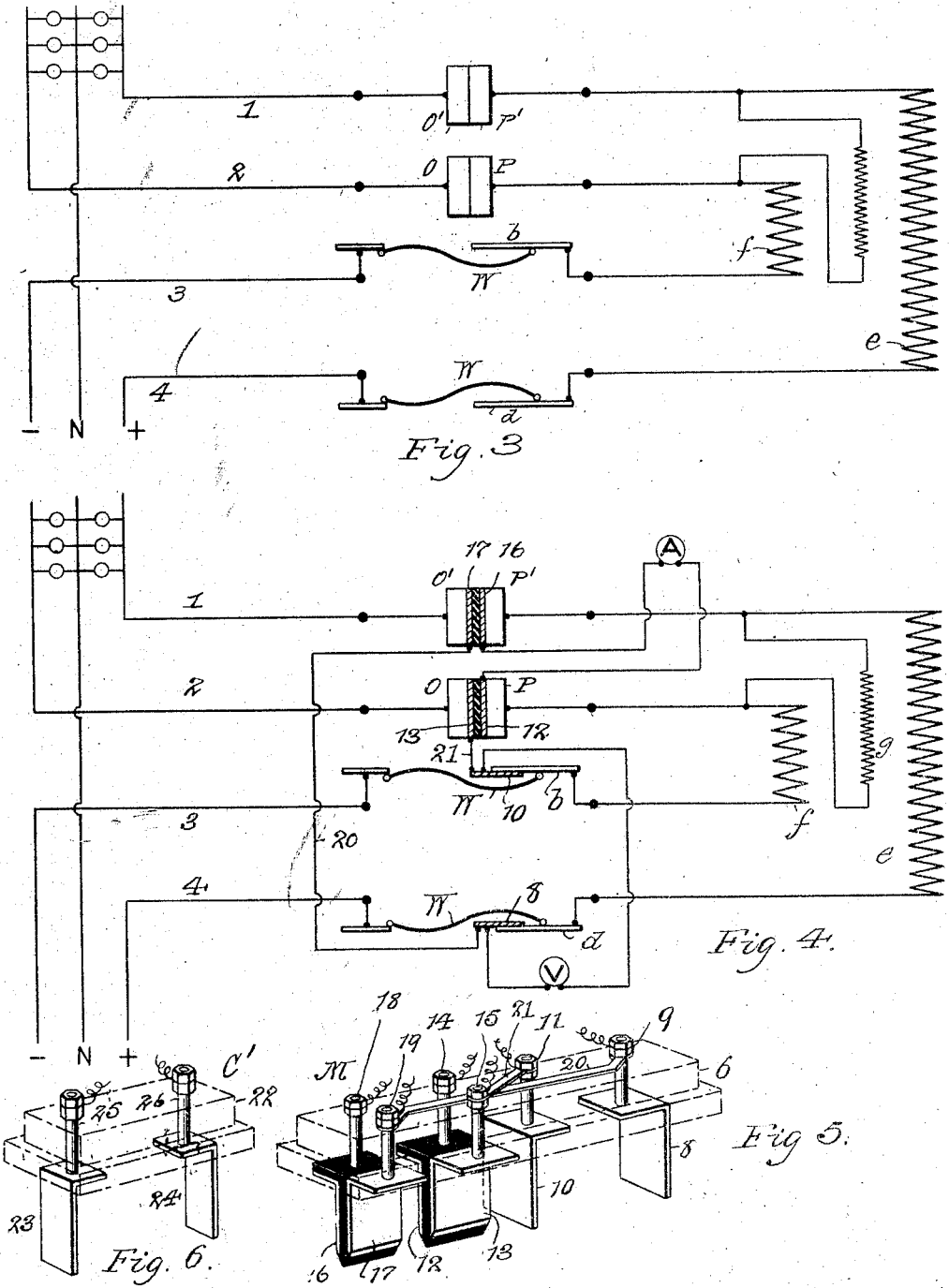

UNITED STATES PATENT OFFICE.

THOMAS E. MURRAY, OF NEW YORK, N. Y.

METER-TESTING CUT-OUT.

1,090,489.   Specification of Letters Patent.   Patented Mar. 17, 1914.

Application filed February 7, 1912. Serial No. 675,993.

*To all whom it may concern:*

Be it known that I, THOMAS E. MURRAY, a citizen of the United States, residing at New York, in the county of New York and State of New York, have invented a certain new and useful Improvement in Meter-Testing Cut-Outs, of which the following is a specification.

The invention relates to meter testing cut-outs, and consists in the construction hereinafter set forth, whereby two series of circuit terminals, disposed on opposite sides of the cut-out block, may be connected interchangeably to a plurality of rods or to the load and service leads, and whereby current may be taken directly by means of a gang plug from fuse holding connections in said block.

Figure 1:
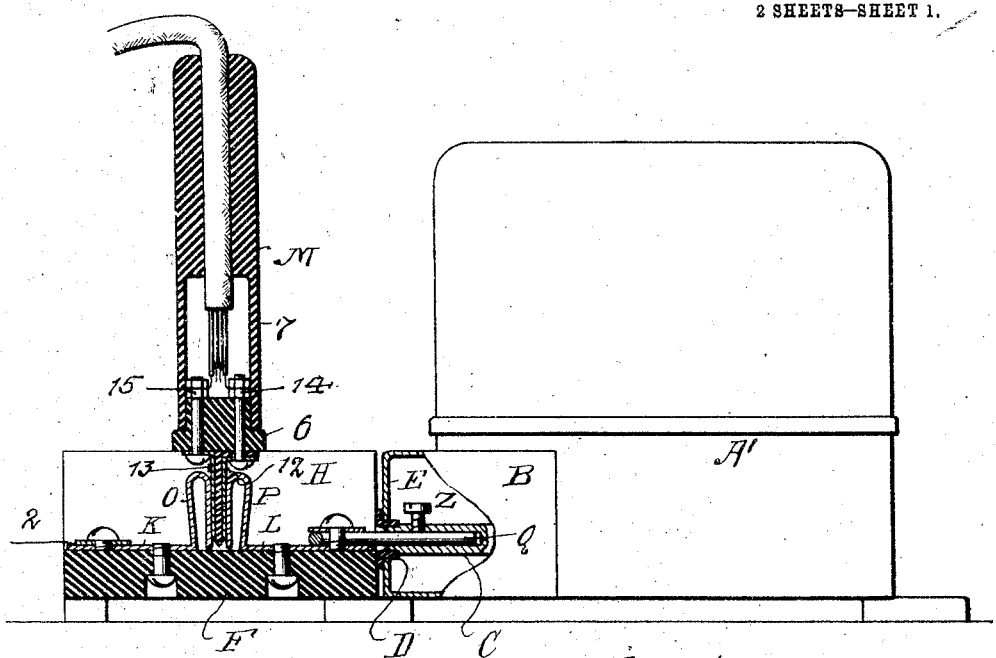
Figure 2:
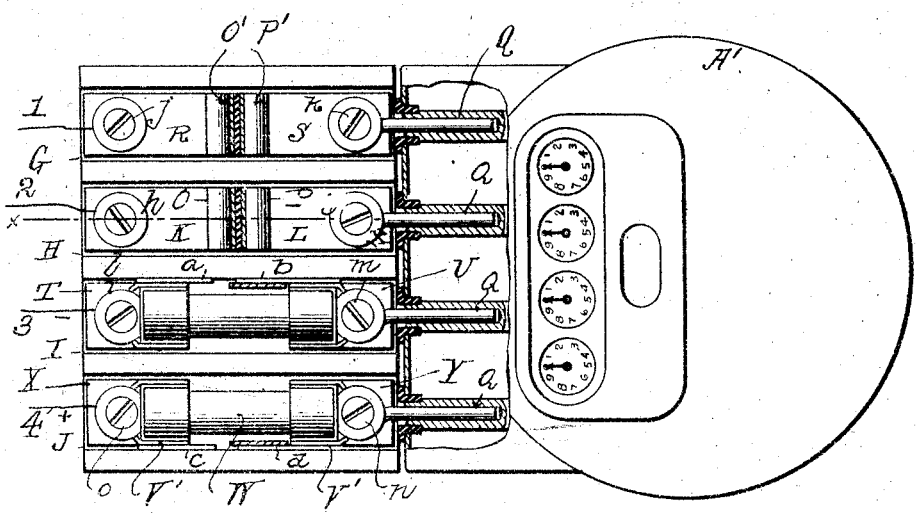
Figure 7:

In the accompanying drawings—Figure 1 is a longitudinal section of my meter testing cut-out on the line $x$, $x$ of Fig. 2, the meter casing being shown in elevation. Fig. 2 is a horizontal section showing the meter casing in plan. Fig. 3 is an electrical diagram showing the service and load lead circuits under running conditions. Fig. 4 is an electrical diagram showing said circuits when the gang plug is in place. Fig. 5 is a perspective view of the gang plug, the supporting bar being in dotted lines. Fig. 6 is a perspective view of an auxiliary gang plug, used in coöperation only with the contacts. Fig. 7 shows one of the connection rods Q separately and in perspective.

Similar numbers and letters of reference indicate like parts.

A′ is the cylindrical casing of an electric meter, having an offset B. The meter terminals C are tubular in form and are received in insulating bushings D in the wall E of said offset.

The cut-out comprises a block F of insulating material, in which are four channels, G, H, I, J. In channel H are two conducting strips K, L, secured to the block by suitable screws, and having their meeting extremities bent upward and over, as shown at O, P in Fig. 1, so as to be normally in contact, but separable by the insertion of a plug, as hereafter described. The strip K is provided at one terminal with a screw $h$ for the attachment of one of the load leads 2. The end of said strip L has a similar screw $i$ for the attachment of a rod Q, Fig. 7, the screw passing through the eye on said rod. In the channel G are similarly arranged strips R, S, having bent over ends O′, P′, similar to O, P, the outer end of strip R being connected to the other load lead 1 by screw $j$, and the outer end of the strip S being connected to another rod Q by screw $k$.

In the channel I are two plates T, U, each having upwardly bent portions at V′ to form a pair of spring clips, in which clips are received the end caps of an ordinary cartridge fuse W. The plate U is connected to a rod Q by screw $m$, and the plate T to one of the service leads 3, by screw 1. In channel J are two plates X, Y, arranged similarly to plates T, U to form clips, the plate Y being connected to a rod Q by screw $n$, and the plate X to the other service lead 4, by screw $o$.

One member of each of the four pairs of clips in channels I, J has a lateral extension, as shown at $a$, $b$, $c$, $d$, the said extensions forming contact plates for purposes hereinafter described. When the end of block F is approximated to the wall E of offset B, the four rods Q enter the tubular meter terminals C, and are detachably secured therein by clamping screws Z.

The gang plug M, Figs. 1 and 5, comprises a supporting bar 6 of insulating material, having a handle 7 (not shown in Fig. 5). Secured to said bar are the following contacts: a plate 8, connected to binding post 9, a similar plate 10, connected to binding post 11, a pair of plates 12, 13, separated by a partition of insulating material and respectively connected to binding posts 14, 15, and a pair of similar plates 16, 17, separated in like manner and respectively connected to binding posts 18, 19. The binding posts 9 and 19 are connected by strip 20, and the binding posts 11 and 15 by a strip 21. The testing ammeter A is connected to binding posts 18, 14, and the voltmeter V to binding posts 9, 11. Under running conditions, circuit proceeds from the plus and minus service leads 4, 3, to the fuses W, to the field coils $e$, $f$ of the meter, to the spring contacts O′, P′ and O, P in channels G and H, and so to the load leads 1, 2, load and neutral N.

When the meter is to be tested, the gang plug M is inserted, so that the pairs of plates 12, 13 and 16, 17 enter between the spring contacts O′, P′, O, P in channels G, H, and the plates 8, 10 establish contact with plates $b$, $d$ in channels I, J. The circuits as shown in Fig. 5, are then as follows: Direct circuit from service leads to load proceeds from service leads 3, 4, to fuses W, to plates $b$, $d$, to plates 8, 10, to gang plug strips 21, 20 to plates 13, 17, and so to load and neutral, thus cutting out the meter. The circuit including the ammeter A is from plus service lead 4, to one fuse W, to meter field coil $e$, to plate P', plate 16, to ammeter A, to plate P, plate 12, meter field coil $f$, to the other fuse W, to minus service lead 3. The circuit of the voltmeter V is across the leads from gang plug plate 8, to gang plug plate 10. The meter potential coil $g$ is connected in the usual way.

The extensions $a$, $b$, $c$, $d$ (not shown in Figs. 3 and 4) on plates T, X, U, Y provide for establishing, for any desired purpose, a shunt from the cut-out block. To this end, the gang plug C', Fig. 6, may be used. This plug has a supporting bar 22, and two depending contact plates 23, 24, similar to plates 8, 10, on gang plug M, which plates are connected respectively to the binding posts 25, 26, to which the shunt terminals are attached. When the plug C' is inserted, the plates 23, 24 coöperate with extensions A, C, so that the current passes to the shunt line, without traversing the meter or fuses W.

It is to be noted that the connections at the respective sides of the block F are alike, and that the rods Q and load and service circuit terminals may be interchangeably secured to the terminals at either side of the block by means of the screws $j$, $h$, $l$, $o$, on one side, and $k$, $i$, $m$, $n$, on the other. When the block is reversed in position from that shown in Fig. 2, so that the rods Q are connected to screws $j$, $h$, $l$, $o$, and the circuit leads to screws $k$, $i$, $m$, $n$, the plates 23, 24 on plug C' coöperate with extensions $b$, $d$, so that the current passes to the shunt line without traversing the fuse. It will be obvious that instead of making the plates $b$, $d$ of greater width than the plates $a$, $c$, they may be made of the same width, and the width of the plates 23, 24 on plug C' may then be made to correspond to that of said plates $a$, $b$, $c$, $d$, so that by placing the plug in contact with plates $b$, $d$, as shown in Fig. 2, the current will go to the shunt without passing to the meter, and by placing the plates 23 and 24 in contact with the plates $a$, $c$, the current will go to the shunt without traversing the fuses. By this last described construction, the reversal of the block end for end is rendered unnecessary. In some meter casings the offset B is placed on one side of the casing, and in others, on the opposite side. The block is adapted to either arrangement, by suitably shifting the circuit terminals and rods, as described.

I claim:

1. An electric cut-out, comprising a base block, two groups of four circuit terminals disposed near opposite edges of one face thereof, contact clips connected to each member of two oppositely disposed pairs of said terminals, two fuse plugs respectively seated in said contact clips, contact clips interposed between the members of the remaining oppositely disposed pairs, and a testing plug coöperating with said last-named contact clips and with the fuse plug receiving contact clips connected to two members of one of said groups.

2. An electric cut-out, comprising a base block having four channels, two pairs of contact clips in each of two of said channels, fuses in said channels coöperating with said clips, one pair of contact clips in each of the remainder of said channels, and a testing plug coöperating with said last-named pairs of contact clips and with one of said contact clips in each of said first-named channels.

3. An electric cut-out, comprising a base block, having two recesses, two circuit terminals in each recess, each of said terminals being in the form of a spring clip, a contact plate on one arm of one clip in each recess, a gang plug having circuit terminals coöperating with said contact plates, and fuses received in said clips.

In testimony whereof I have affixed my signature in presence of two witnesses.

THOMAS E. MURRA

Witnesses:
 GERTRUDE T. PORTER,
 MAY T. McLARRY.